United States Patent Office 3,114,039
Patented Dec. 10, 1963

3,114,039
SELF-DEVELOPING PENETRANT METHOD OF FLAW DETECTION AND PENETRANT THEREFOR
Joseph L. Switzer, Gates Mills, Ohio, assignor to Switzer Brothers, Inc., Cleveland, Ohio, a corporation of Ohio
No Drawing. Filed Aug. 31, 1960, Ser. No. 53,035
21 Claims. (Cl. 250—71)

This invention relates to improvements in fluorescent penetrant methods of non-destructive testing of materials, pieces, parts and structures (also referred to hereinafter as "test bodies") for surface discontinuities and the penetrants used in such methods; more particularly, this invention relates to such a method which eliminates the use of the developers heretofore required for the most reliable indications of the surface openings of flaws in the tested parts and structures and to self-developing fluorescent penetrants which may be used in this improved method.

A fluorescent penetrant method of non-destructive testing was first disclosed in U.S. Patent No. 2,259,400, issued to R. C. Switzer. Such methods and penetrants and various improvements therein have become widely used in this and foreign countries in numerous industries for the production and maintenance of parts and structures which are subjected to stress but designed with moderate or relatively small factors of safety or which are intended for uses where safety against failure of the part or structure during use is of great or utmost importance, such as, for example, various aircraft parts and structures. The fluorescent penetrant methods are relatively rapid, inexpensive, and may be extremely sensitive in detecting both gross and minute flaws having surface openings. These methods do not detect flaws which are entirely sub-surface, such as voids, internal laminations, slag stringers, or like flaws which have no surface openings or whose surface openings, if any, have been closed. In many instances, especially in highly stressed areas, however, minute surface discontinuities, such as incipient fatigue cracks, grinding cracks and the like, may often be more dangerous and the sources of failure in use than relatively gross sub-surface flaws. It is primarily because of the sensitiveness of the fluorescent penetrant methods to such minute as well as gross sub-surface flaws having surface openings, without regard to the composition of the part being tested, that fluorescent penetrant methods of non-destructive testing have become so extensively used and relied upon.

As disclosed and claimed in the aforesaid Switzer patent, fluorescent penetrant methods essentially comprise the steps of applying a fluorescent penetrant liquid to the surface of the test body suspected of having flaws with surface openings to permit the penetrant to enter the surface flaws, removing the penetrant from the surface of the body being tested, allowing the penetrant retained in the flaws to exude to the cleaned surface, and then inspecting the body under fluorescigenous radiation, e.g., filtered ultraviolet ["black light"] in substantial absence of visible light. The enormous contrast ratio between the visible light emitted from exuded fluorescent penetrant at and about flaw openings and the absence of visible light emitted or reflected from adjacent non-fluorescent unflawed areas can quickly indicate the extent and location of the sub-surface flaws, even when the flaw openings are practically microscopic in size.

In theory, there would be an infinite contrast ratio between the minute area of visible light-emitting penetrant at and adjacent the flaw openings and the absence of any visible light projected by emission or reflection from unflawed areas. In practice, however, many factors contribute to decreasing that contrast ratio which accounts for the effectiveness of fluorescent penetrant methods of testing. For example, if traces of the penetrant are not thoroughly removed from the unflawed surface when the body is inspected under black light such traces may provide a "background scum" of light which decreases the contrast with the light emitted by the exuded penetrant. A substantial contribution to overcoming this problem was made by the use of so-called water-wash system, as disclosed in the Ward patent, 2,405,078, in which an oily penetrant is removed from the surface of the test body by emulsification; emulsification can strip the penetrant from the surface without removing it from the flaw, rather than leaving a diluted residue of fluorescent penetrant, as may often result when the surface of the body is cleaned with solvents. The problem of "background scum" may be present in practicing this invention and, accordingly, the use of self-emulsifying or emulsifiable penetrants is generally preferred.

Another factor decreasing the needed contrast ratio is the tendency of the penetrant to wet and spread into exceptionally thin films on the material of the body being tested. This characteristic is obviously necessary in order for the penetrants to enter the flaw openings when the penetrant is first applied and to exude therefrom onto the cleaned surface of the flaw openings after excess penetrant has been removed and the test body is to be inspected under fluorescigenous radiations. Unfortunately, this same inherent and necessary tendency can cause the penetrant to spread into an excessively thin film. Being exceptionally thin, such a film is necessarily highly translucent to both the exciting radiation and emitted visible light and so extends the volume of penetrant exuded from a minute flaw that, under black light or other fluorescigenous radiation, the film is too weakly fluorescent to be recognized as an indication of a flaw opening. This becomes a particularly serious problem when the material of the test body, as is very frequently the case, absorbs the fluorescigenous radiation and/or is of a color which absorbs the visible light which should be emitted by the film of fluorescent penetrant, assuming that the exciting radiation is not first absorbed by the surface upon which the film of penetrant retained in in the flaws has exuded.

Thus, it was recognized at the outset of the use of fluorescent penetrant methods that some means or method of "developing" the flaw indications of fluorescent penetrant methods preparatory to the inspection step was highly desirable and practically essential for detection of very small flaw indications, especially when the method was to be used to detect ultra-fine incipient fatigue cracks and the like. The original R. C. Switzer patent, No. 2,259,400, disclosed various means and steps for developing the flaw indications. These steps fall into two essential systems. One system disclosed is that of agglomerating the exuded penetrant by crystallization (cooling) or chemical reaction so as to create a "pile" of flaw indicating medium around the flaw opening. The other system was that of applying to the surface of the test body, after or during exudation and before inspection, a thin layer of an absorptive material which drew a larger volume of fluorescent penetrant from the flaw and provided a background which not only masked adjacent "background scum," but also served as a reflective background both for the incident exciting radiation and the visible light emitted by the fluorescent penetrant. The "piling up" technique suggested by the Switzer patent did not mask the background scum or provide the reflective background of absorbent developers. Also, when the piling up was achieved by crystallization or similar solidification through cooling, either a relatively weakly fluorescent compound had to be used in the penetrant or the more powerfully fluorescent dyes were likely to be crystallized along with the vehicle; in the latter case the fluorescence of the dyes would thereby be destroyed or greatly diminished, since a common characteristic of fluorescent dyes is that they are non-fluorescent or very weakly fluorescent in a crystalline or undissolved state and achieve optimum fluorescence only in relatively dilute solution. Where the "piling up" was achieved by chemical reaction with another substance, the effectiveness was dependent upon a sufficient volume of exuded penetrant adjacent to the flaw to produce an adequate volume of reaction product; this condition often did not exist when an extremely minute amount of penetrant was exuded from a very small flaw and the penetrant spread to an exceptionally thin film adjacent the flaw. Further, there was always the suspicion that the agglomeration, however achieved, might have occurred within the sub-microscopically small flaw opening and thus blocked the necessary exudation.

Accordingly, since the advent of fluorescent penetrant methods of non-destructive testing, the art has relied almost exclusively upon absorbent developing agents to develop fluorescent flaw indications. As practiced and developed, the absorptive agents comprise fine powders of french talc, clays, or like extremely fine pulverized powder which is relatively reflective of both the exciting radiation and the visible light emitted by the fluorescing penetrant. The powder is applied in the form of a dry dust or in the form of a suspension in a volatile liquid which leaves a substantially uniform absorptive layer of powder on the surface of the test piece. The absorptive layer "blots" the penetrant out of the flaw openings and provides an excellent contrasting background for the "blots" which show up at the inspection step while masking the background scum.

There are two main drawbacks, however, to absorptive developers which have heretofore seemed unavoidable, except at the expense of the accuracy, sensitiveness, and dependability of the absorptive developer systems. First, the step of application of the developer prior to inspection is not only an additional operational step, but it must be carefully performed. Application of the absorptive developer in layers which are too thin voids their effectiveness; application in layers which are too thick may mask the indications as well as background scum; and a still greater problem is the application of the absorptive developer in a layer of equal thickness on different areas of the same test body and on successive test bodies. Secondly, after inspection, the absorptive developers must frequently be thoroughly cleansed from the part being tested, especially in the cases of parts having highly finished surfaces or surfaces which must be subsequently treated, as by plating, anodizing, or the like, and the presence of the developer may contaminate or interfere with later use or treatment. The very fineness of the particles of most absorptive developers can make this additional re-cleansing step (since the test piece is usually thoroughly cleaned preliminarily to testing) a troublesome operation. These drawbacks to absorptive developers become especially pronounced in use of the fluorescent penetrant methods for production testing of large quantities of parts.

It is the object and advantage of this invention to provide a method which, by eliminating the use of additional developer materials, overcomes the aforementioned drawbacks of the absorptive developer of fluorescent penetrant indication. Although an operational step is required in the use of the novel self-developing penetrants, it is a particular advantage that this step is often the same as, or accomplished simultaneously with, a preferred step in promoting exudation of the penetrant. A particularly surprising advantage of the invention is that the entire inspection operation may be accelerated and the flaw indications may be as sensitive, accurate, and reliable as those heretofore obtained with absorptive developers, if not more so. Other objects and advantages of this invention will be apparent to those skilled in the art from the following description of the invention, the specific examples given by way of illustration and not as limitations, and the appended claims.

In general, the method of detecting flaws according to the present invention comprises the following steps, which may be carried out in a number of different ways:

A fluorescent liquid which thoroughly wets the surface of the test body so as to spread and penetrate into flaw openings is applied to a surface of the body being tested. The fluoroescence is imparted by a dissolved fluoragent, i.e., a dye, dyestuff, dye intermediate, petroleum fraction, or like compound which is soluble in the liquid penetrant vehicle to impart fluorescence or enhance its natural fluorescence. The fluorescent liquid penetrant is then allowed to penetrate into the surface openings of subsurface flaws in the body, after which substantially all of the liquid remaining on the surface of the body is removed. Energy is applied to the body to transform the liquid exuding from the flaw openings to a substantially immobile amorphous, visible-light dispersing state so as to resist the tendency of the liquid to spread on the surface while retaining in a solvated state the fluorescent dyes or like fluoragent. After this has been accomplished, the test body is subjected to exciting radiation, whereby the extent and location of the flaws in the body is revealed by the fluorescing liquid immobilized at and about the surface openings of the flaws of the test body.

The most convenient form of energy applied to immobilize the exuding penetrant so as to develop sensitive and discernible flaw indications is usually heat; the penetrant may be subjected to heat by convection, conduction, and/or infra-red radiation, or heat may be induced in the test body by alternating induced electric current or electrical resistance, in the case of metallic and like more highly electrically conductive test bodies, or by ultra radio irradiation frequency, in the case of lesser electrically conductive plastics and non-metallic test bodies. Accordingly, the following specific examples of illustrative operative penetrants used according to the improved method are designed to respond to applied heat energy.

Without excluding the possibility of other explanations of why the following operative penetrant vehicles, given by way of example and not as limitations, respond to heat so as to operate as self-developing penetrants, so far, at least, the heat-responsive self-developing penetrants comprise solutions of fluoragents in multi-component vehicles, which vehicles are highly liquid and have a pronounced tendency to wet and spread on the surface of the test body, at least until the stage of self-development under heat. Upon the application of heat, the liquid penetrant vehicles exuding from the flow openings metamorphose into one of the following states: (a) a substantially solvent-free solid which is amorphous or sufficiently non-crystalline so as to hold the fluoragent in a solvated state (i.e., in true solution or a state of substantially molecular dispersion akin to solutions); (b) a substantially solvent-free or relatively highly viscous liquid in which the fluoragent is solvated; (c) a colloidal dispersion of at least two components of the initial penetrant vehicle, at least one of which solvate the fluoragent; (d) a gel of at least two components of the initial penetrant vehicle, at least one of which solvates the fluoragent. Whether the immobilized residuum is solid; a viscous, relatively non-spreading liquid; a colloidal dispersion; or a gel, it has been discovered that it must also have another characteristic for optimum self-development, namely, it should not be of a color which is highly absorptive of light emitted by the fluoragent, but it should be translucent rather than transparent to the emitted light of the excited fluoragent so as to scatter it and provide a diffuse reflecting background for the visible light generated within the residuum.

From the foregoing, it will be seen that the heat-responsive self-developing penetrant vehicles meeting the above conditions will be comprised, in their simplest formulation, of two components. In a two-component vehicle system, one will be a liquid before formulation with the other; the other component may be either a liquid or solid before formulation, but the mixture of the two will be a liquid when formulated as the vehicle for the fluoragent. If the mixture forms a true solution, then the vapor pressure of one component must be such as to be substantially evaporated by the heat of development, leaving the other as a light-dispersing residuum solvating the fluoragent. If the vapor pressure of neither component is sufficient to leave a substantially solvent-free residuum under the heat of development, then it has been found that one of the two components cannot be a true solvent for the other in the concentrations present in the residuum; rather, the two components must be dispersed as a colloidal dispersion or as a gel. The second of the following specific examples is provided to demonstrate, in comparison with the first and third, the inoperativeness of two-component penetrant vehicle where one is a true, rather than an apparent, solvent for the other and, when a true solvent, does not have a sufficient vapor pressure to leave a substantially solvent-free residuum.

As will also be apparent from the following examples given by way of illustration and not as limitations, operative self-developing penetrant vehicles may be comprised of a number of components greater than two, but, in such multiple component vehicles, at least two will have relative physical characteristics common to those of the above-described two-component systems cooperating with each other so as to leave a residuum meeting the general requirements stated. Also, while not necessarily restricted thereto, non-ionic and anionic surfactants which do not have a color absorptive of the visible light emitted by the solvated fluoragent and which are composed of associated, strongly lipophilic and lipophobic groups are among the most satisfactory components for the developed residuum of the penetrant vehicles.

In the following illustrative examples, all parts are parts by weight. For purposes of comparison, both with each other and with the commercial penetrant used in the subsequently described controls, a common fluoragent was used in the proportion of .659 part of fluoragent to approximately 100 parts of vehicle. The specific fluoragent was:

| Fluoragent: | Parts |
|---|---|
| Fluoral 7GA (naphthalimide fluorescent oil-soluble dyestuff sold by General Dyestuffs Corporation) | .385 |
| 4-methyl, 7-diethyl-amino coumarine | .274 |
| | .659 |

The following illustrative examples and the controls were all tested on standard aluminum test blocks prepared according to U. S. military specification MIL–I 25135 (ASG) to provide heat cracks ranging in size from a few gross flaws to many indiscernible minute flaws. The fluorescent penetrants, both of the illustrative examples and the controls, were applied by a laboratory spatula to provide an even coating of the penetrant over the test block surface and allowed to remain thereon for approximately five minutes before removal, by the method or mechanism indicated, so that no penetrant was on the surface when observed under filtered ultra-violet ("black light") to which the fluoragent was responsive. Where the penetrant was removed by washing with a stream of water, excess water was blown off before development. Except as otherwise stated, all test blocks, both for the illustrative examples and the controls, were subjected to heat during development by placing them for five minutes in a circulating air oven on which the precision temperature control was set at 210° F. When heat was applied during development, and except where development was observed during heating, the block was cooled until comfortable to handle before inspection under black light.

All of the following examples (except Example 2) produced, without application of a separate developer, bright distinct indications of gross, intermediate, and fine flaws equal or better than the indication obtained with the standard commercial fluorescent penetrant obtained according to Control Procedure I, set forth below. All blocks tested with the penetrants made according to the following examples (except Example 2), were rechecked fifteen minutes after initial inspection, and except as noted, there was no discernible spread or other loss of distinctiveness of the indications.

SELF-DEVELOPING, SELF-EMULSIFIABLE (WATER WASH) PENETRANTS

Example 1

| | Parts |
|---|---|
| Alipal LO 529 (an alkaline organic phosphate ester non-ionic surfactant sold by Antara Chemical Division of General Aniline & Film Corp.) | 30 |
| Isopropyl alcohol | 70 |
| Fluoragent | .659 |

The above penetrant was applied to the test block, removed by water wash, and dried according to the procedure described above. The block was heated on a hot plate set to give a surface temperature of between about 140° and 220° F. During heating, the block was observed under black light. Fluorescing streaks of penetrant promptly began to appear at the location of the grosser cracks, but remained as relatively elongated globules as smaller fluorescing globules and bright specks of light began to appear in the characteristic pattern of cracks imparted by the procedure of cracking the test blocks. When more flaw indications no longer appeared, the block was removed from the hot plate. As the block cooled, a few of the adjacent smaller globules coalesced into relatively elongated globules, indicating continuous cracks whose larger openings were connected by narrower cracks, but otherwise the various flaw indications remained as distinct indications of distinctly separate cracks of varying size and extent.

The isopropyl alcohol is a true solvent for the residual component, Alipal, as indicated by the relative absence of light-scattering by the clear solution before addition of the fluoragent. The isopropyl alcohol was completely volatilized by the time of inspection, leaving a relatively non-smearing residue at and around the flaw openings, illustrating the operativeness of a solvent-free solid or highly viscous liquid which solvates the fluoragent and which is a translucent dispersive reflector of the light emitted by the fluoragent.

Example 2

| | Parts |
|---|---|
| Alipal LO 529 | 30 |
| Diethylene glycol | 40 |
| Isopropyl alcohol | 30 |
| Fluoragent | .659 |

The diethylene glycol, though a relatively non-volatile alcohol, is a true solvent for the surfactant, Alipal, as indicated by the light test prior to addition of the fluoragent to the solution. This fluorescent penetrant was applied to the test block, removed, dried, and heated, as the penetrant of Example 1. Exudation was sufficiently slower to indicate the function of a relatively volatile solvent at the temperature of development to expedite the exudation of penetrant by vapor pressure developed within the confines of the flaw. However, even when exudation was clearly discernible at grosser flaws, at no time did the exuded penetrant, though relatively viscous after cooling, cease to spread. Particularly, however, the indications were relatively dull and smaller flaws distinctly revealed by the penetrant of Example 1 were not discernible except by application of a separate developer, demonstrating the unsatisfactoriness of a residuum of a viscous liquid if the residual liquid is still a true solution.

Example 3

| | Parts |
|---|---|
| Alipal LO 529 | 30 |
| Hi-flash kerosene | 70 |
| Fluoragent | .659 |

In the above penetrant, the kerosene, while an apparent solvent for the surfactant, Alipal, holds the surfactant in a colloidal suspension, as indicated by the light test for true and apparent solutions. The penetrant was applied, removed, and developed as in Examples 1 and 2. Indications were bright and the small as well as the gross indications were as distinct and readily discernible, as in Example 1, or more so, demonstrating the satisfactoriness of residual viscous liquid in which the vehicle components constitute a colloidal suspension serving as a light-dispersing medium for the solvated fluoragent. At the fifteen minute re-check, there appeared to be a slight spreading, demonstrative that not all of the kerosene was dried off during development so as to leave a solid residue, but such spreading and the smearing of gross flaw indications by handling were not sufficient to impair the usefulness of the penetrant, if used with reasonable care.

Example 4

| | Parts |
|---|---|
| Alipal Lo 529 | 30 |
| Stoddard solvent | 70 |
| Fluoragent | .659 |

The above penetrant was applied, washed off, and the test block dried, as in the preceding examples. Heat was applied, however, by a 250 watt infra-red bulb held twelve inches above the test block for two minutes. The development was rapid and indications seemed somewhat brighter and sensitive than the indications of Examples 1 and 3. No spread was observed at the re-check, suggesting that presumably greater volatility of the Stoddard solvent left a more rigid colloidal suspension.

Example 5

| | Parts |
|---|---|
| Triton X-45 (a non-ionic surfactant reported to be a condensation product of ethylene glycol and an alkyd phenol, sold by Rohm & Haas Co.) | 8 |
| Oleic acid | 8 |
| 45% aqueous potash solution | 2 |
| Triethanolamine | 1 |
| Diethylene glycol (a coupling agent) | 3 |
| Stoddard solvent | 78 |
| Fluoragent | .659 |

The above penetrant was applied, removed, and developed in an air-circulating oven set at 210° F. for five minutes, as set forth in the standard test procedure described at the outset of these illustrative examples and as followed in all subsequent examples. The fluorescent residuum of the penetrant appeared to be a gel of the Triton X-45 and the soap formed by the oleic acid, potash solution and triethanolamine. The flaw indications were bright, sensitive, and well-developed.

Example 6

| | Parts |
|---|---|
| 9–11 acids (Baker Castor Oil Co.-distilled monocarboxylic acids of dehydrated castor oil consisting largely of linoleic acid with 30% conjugated double bonds) | 17 |
| 16% caustic soda solution | 10 |
| Dipropylene glycol | 8 |
| Stoddard solvent | 65 |
| Fluoragent | .659 |

The above colloidal suspension of a carboxy soap was tested as in Example 5. The indications were exceptionally bright and well developed.

POST-EMULSIFICATION TYPE OF PENETRANT

Example 7

| | Parts |
|---|---|
| N-hexylbenzabide | 30 |
| N-butanol | 5 |
| High-flash kerosene | 65 |
| Fluoragent | .659 |

Example 8

| | Parts |
|---|---|
| N-hexylbenzamide | 30 |
| Solvesso 150 (a hydrocarbon solvent sold by The Standard Oil Company of New Jersey) | 70 |
| Fluoragent | .659 |

Both of the above penetrants of Examples 7 and 8 were applied to the test blocks and then an application of an emulsifier, ZE3, (a product of Magnaflux Corporation) was made, the emulsifier being allowed to stand for one minute and then washed in water to remove the oily penetrant from the surface. The cleaned test blocks were then heated in the oven at 210°. The indications were bright and sensitive. A tendency of the penetrant of Example 8 to spread was noted, but may be controlled by the time and temperature in the oven so as to produce satisfactory self-developed indications.

SOLVENT-REMOVAL PENETRANTS

Example 9

| | Parts |
|---|---|
| Ethanolamide | 30 |
| N-butanol | 5 |
| Solvesso 100 | 65 |
| Fluoragent | .659 |

Example 10

| | Parts |
|---|---|
| Caprylolyl stearlyl amine | 18.7 |
| Chloroform | 81.3 |
| Fluoragent | .659 |

The above penetrants were applied and tested according to the standard procedure, except that they were removed from the surface of the test block by wiping the surface with a soft rag, employing acetone as the solvent. When carefully wiped so as not to remove penetrant from the flaw openings while leaving none on the unflawed surface, the indications were bright and sensitive.

WATER-BASE, WATER-WASH PENETRANTS

Example 11

| | Parts |
|---|---|
| Carbowax 4000 (Union Carbide Chemical Co.) | 10 |
| Triton X-45 | 20 |
| Isopropanol | 30 |
| Water | 50 |
| Fluoragent | .659 |

Example 12

| | Parts |
|---|---|
| Lauric myristic diethanol amide | 20 |
| N-butanol | 5 |
| Water | 65 |
| Fluoragent | .659 |

The above penetrants were applied, washed carefully with water, dried, developed, and tested according to the standard procedure. The flaw indications were bright and sensitive. Example 12 was noteworthy in that, while the flaw indications were bright and satisfactorily developed by heating in the oven, application of a dry developer ZP4 (sold by Magnaflux Corporation) enhanced the brightness of and sensitivity noticeably, even though the indications developed by heat alone were, practically, equivalent to the indications obtained by the commercial non-self developed penetrant described in Control I, below.

CONTROLS (I) As a control for comparison with the results obtained with the above example and other self-developing penetrant formulations tested, a standard test block was coated with an application of "Zyglo" ZL1B, a commercial self-emulsifying penetrant sold by Magnaflux Corporation. After application and removal by washing with water, and drying, a dry developer powder, ZP4, was dusted on the test block pursuant to the manufacturer's directions. Then the test block, with the developer applied, was heated five minutes in an air-circulating oven at 210°, as in testing the above examples. As noted above, the indications obtained with the self-developing penetrants were, for most practical purposes, equally as acceptable as the indications developed in this control if not more so.

(II) As a second control and to demonstrate that the step of heating the test piece to develop the self-developing penetrants imposes no operational burden over and beyond that obtained with optimum development by a separate developer, Control I, above, was repeated, except that the test block was not heated but allowed to stand at room temperature. Even after standing for fifteen minutes, the flaw indications of this second control, using a separate developer, did not equal the self-developing penetrants of the foregoing example (i.e., all except Example 2) or Control I in sensitivity and brightness.

(III) As a third control to demonstrate the self-developing character of the illustrative examples, Control I was repeated except that application of the developer was omitted. Penetrant exuded from the grosser flaws but spread over very large areas so that the location of the grosser flaw was no longer as distinct as in Control I and the tests of the illustrative examples; indications of the smaller flaws were lost as background scum, if they had ever been discernible.

From the foregoing, it should be apparent that self-developing penetrants may be formulated for any type of removal of the initially applied penetrant, as by emulsification, solvent and/or mechanical removal. Further, while heat is the most convenient form of energy applied for development, penetrants may be formulated to employ other forms of energy. Thus, for instance, penetrants containing a substantial proportion of gelatin or similar materials which harden upon exposure to light may be formulated so as to use light energy in place of or in addition to heat or other energy. Likewise, a principal component of the penetrant vehicle may be lower molecular weight polyolefin liquid or solution which tends to harden in response to electron discharge, X-ray, and shorter wave length radiant energy.

The savings in time, labor, and processing supplies, as well as the simplification or processing operation and equipment will be obvious from the foregoing disclosure of the invention, especially in conjunction with inspection of mass-produced parts and regardless of whether automatic or semi-automatic inspection equipment is employed. Thus, this invention is not limited to the specific embodiments disclosed or the explanation of present apparent mode of operation but may be modified by those skilled in the art without departing from the scope of the appended claims.

What is claimed is:

1. The method of detecting flaws having surface openings in test bodies comprising the steps of applying to the surface of the test body a penetrant liquid carrying a tracer material, said penetrant liquid being normally capable of wetting and spreading into surface openings of flaws in the test body but capable of being relatively immobilized in response to a given form of energy, removing said penetrant from said body after said penetrant has penetrated into such surface openings, causing penetrant retained in said flaws and flaw openings to exude to the surface of said test body, developing said exuded penetrant by applying energy to which said penetrant is responsive in order to alter and relatively immobilize said exuded penetrant at and around said flaw openings, and then inspecting said test body to ascertain the extent and location of said flaw openings by indications produced by the tracer in said exuded and immobilized penetrant.

2. The method of claim 1 in which said tracer is a fluoragent solvated in said penetrant and the extent and location of said flaw openings is revealed by visible light emitted in response to fluorescigenous radiation.

3. The method of claim 2 in which the energy applied to immobilize said exuded penetrant is applied in the form of heat.

4. The method of claim 3 in which the immobilized penetrant at and around the flaw openings solvates said fluoragent and is translucent and dispersive of light emitted by said fluoragent.

5. The method of claim 4 in which said penetrant comprises a multi-component vehicle and said fluoragent, and said vehicle is comprised of at least two components, one of which is dispersed in the other and the vehicle is of the class consisting of true solutions and colloidal suspensions.

6. The method of claim 5 in which the application of heat metamorphoses the exuded penetrant to change the penetrant vehicle from a liquid which wets and spreads on the surface of the test body to a relatively immobilized form of the class consisting of a relatively solvent-free solid, a relatively solvent-free liquid more viscous than said penetrant liquid when applied to the test body, a colloidal suspension of said components, and a gel of said components.

7. The method of claim 6 in which one of the components of said penetrant vehicle is a liquid having a sufficient vapor pressure to evaporate from said penetrant at the temperature induced by said heat and leave a residuum of the class consisting of relatively solvent-free solids, and a liquid more viscous than said penetrant vehicle.

8. The method of claim 7 in which one of said components is relatively volatile and the second is relatively non-volatile and is dissolved in said relatively volatile component before the application of said heat.

9. The method of claim 8 in which said relatively volatile component is of the class consisting of alcohols and hydrocarbon solvents and said relatively non-volatile component is of the class consisting of non-ionic and anionic surfactants having associated lipophilic and lipophobic groups.

10. The method of claim 6 in which one component of said penetrant vehicle is a relatively volatile liquid but having insufficient vapor pressure to evaporate from the less volatile residuum of said vehicle so as to leave a substantially solvent-free residuum of exuded penetrant at and around said flaw openings after the application of heat to develop and immobilize said exuded penetrant and said residuum is of the class consisting of colloidal suspensions and gels of said relatively volatile and non-volatile components.

11. The method of claim 10 in which said relatively volatile component is of the class consisting of hydrocarbon liquids and alcohol.

12. The method of claim 11 in which the relatively non-volatile component includes a non-surfactant and colloidally dispersed in said relatively volatile solvent.

13. The method of claim 10 in which said relatively volatile component is water.

14. The method of claim 13 in which the relatively non-volatile residuum includes one or more compounds of the class consisting of surfactants of the class consisting of non-ionic and anionic surfactants having associated lipophilic and lipophobic groups, alcohols, and non-surfactants colloidally dispersed in said water.

15. A self-developing penetrant liquid for penetrant method of flaw detection including a tracer, and a vehicle in which said tracer is solvated, said vehicle consisting essentially of a liquid which wets and spreads on the surface of a test body to enter and exude from flaw openings of a flawed test body but which is relatively immobilized when it exudes from a flaw opening onto a relatively penetrant-free surface of the test body when said penetrant is subjected to the application of energy as said penetrant exudes said penetrant vehicle continuing to solvate said tracer.

16. A self-developing penetrant as defined in claim 15 in which said tracer is a fluoragent and said immobilized penetrant vehicle is translucent and dispersive of light emitted by said fluoragent when said fluoragent is excited.

17. A self-developing penetrant as defined in claim 16 in which said vehicle comprises a relatively volatile portion and a relatively non-volatile portion mixed to provide liquid mixtures of the class consisting of solution and colloidal dispersions, said relatively non-volatile portion, when immobilized by heat to develop said penetrant and evaporate at least a portion of said relatively volatile portion leaving a residuum of the class consisting of relatively solvent-free solids, relatively solvent-free liquids more viscous than said initial penetrant vehicle, and colloidal dispersions and gels of said residual relatively volatile and non-volatile portions.

18. A self-developing penetrant as defined in claim 17 in which said relatively volatile portion includes liquid of the class of hydrocarbon solvents and alcohols having a vapor pressure sufficient, at the temperature and during the time to which said penetrant is subjected to the heat applied for immobilization, to leave a substantially solvent-free residuum of the class consisting of solids and liquids relatively viscous with respect to the viscosity of said penetrant vehicle prior to immobilization.

19. A self-developing penetrant as defined in claim 18 in which the relatively volatile portion includes components of the class consisting of non-ionic and anionic surfactants having associated lipophilic and lipophobic groups and non-surfactants colloidally dispersed in said relatively volatile portion.

20. A self-developing penetrant as defined in claim 17 in which said relatively volatile portion includes liquids having an insufficient vapor pressure at the temperature and during the time of immobilization to leave a residuum substantially free of said relatively volatile portion and the said relatively non-volatile portion is colloidally dispersed in said non-volatile portion.

21. A self-developing penetrant as defined in claim 17 in which said relatively volatile portion includes liquids of the class consisting of water, alcohols, and hydrocarbon solvents and said relatively non-volatile portion includes at least one component of the class consisting of non-ionic and anionic surfactants having lipophilic and lipophobic groups and non-surfactants colloidally dispersed in said non-volatile portion.

References Cited in the file of this patent

UNITED STATES PATENTS

| | | |
|---|---|---|
| 2,635,329 | De Forest et al. | Apr. 21, 1953 |
| 2,707,236 | De Forest | Apr. 26, 1955 |
| 2,878,392 | Polito | Mar. 17, 1959 |

OTHER REFERENCES

Fluorescent Penetrant Inspection, by G. Ellis, from Steel, vol. 115, No. 16, Oct. 16, 1944, pages 100, 101, 102, 164.